United States Patent
Jung et al.

(10) Patent No.: US 9,916,251 B2
(45) Date of Patent: Mar. 13, 2018

(54) DISPLAY DRIVING APPARATUS AND CACHE MANAGING METHOD THEREOF

(71) Applicant: Samsung Electronics Co., Ltd., Suwon-si, Gyeonggi-do (KR)

(72) Inventors: Jinyong Jung, Suwon-si (KR); Seok-Hoon Kim, Yongin-si (KR); Euicheol Lim, Hwaseong-si (KR); Jinseok Ha, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 133 days.

(21) Appl. No.: 14/955,070

(22) Filed: Dec. 1, 2015

(65) Prior Publication Data
US 2016/0154739 A1    Jun. 2, 2016

(30) Foreign Application Priority Data

Dec. 1, 2014 (KR) .................. 10-2014-0169734
Oct. 7, 2015 (KR) .................. 10-2015-0141186

(51) Int. Cl.
    *G06F 12/08*      (2016.01)
    *G06F 12/0875*    (2016.01)
    *G09G 3/00*       (2006.01)
    *G06T 1/60*       (2006.01)

(52) U.S. Cl.
    CPC ............ *G06F 12/0875* (2013.01); *G06T 1/60* (2013.01); *G09G 3/00* (2013.01); *G06F 2212/1016* (2013.01); *G06F 2212/401* (2013.01); *G06F 2212/455* (2013.01); *G06F 2212/60* (2013.01)

(58) Field of Classification Search
    CPC ..... G06T 1/60; G06F 3/0608; G06F 12/0871; G06F 12/0875; G06F 12/0886; G06F 2212/455; G06F 2212/401
    See application file for complete search history.

(56) References Cited

U.S. PATENT DOCUMENTS

| | | |
|---|---|---|
| 6,003,119 A | 12/1999 | Silberman et al. |
| 6,430,666 B1 | 8/2002 | Roth |
| 6,854,033 B2 | 2/2005 | Solomon et al. |
| 7,421,568 B2 | 9/2008 | Stempel et al. |
| 7,568,070 B2 | 7/2009 | Bridges et al. |
| 8,655,088 B2 | 2/2014 | Ogawa |
| 8,719,503 B2 | 5/2014 | Koob et al. |
| 2005/0071151 A1* | 3/2005 | Adl-Tabatabai ........ H03M 7/30 704/10 |

(Continued)

FOREIGN PATENT DOCUMENTS

| | | |
|---|---|---|
| JP | 2000-175201 A | 6/2000 |
| JP | 3962440 B2 | 8/2007 |

*Primary Examiner* — Hal Schnee
(74) *Attorney, Agent, or Firm* — Harness, Dickey & Pierce, P.L.C.

(57) ABSTRACT

A cache managing method of a display driving apparatus may be provided. The display driving apparatus including an encoder to generate compressed data by compressing raw data, a memory to store the compressed data, and a decoder to restore the compressed data and including a payload cache may be provided. The cache managing method including requesting an access to the compressed data, and managing the payload cache using a linked list according to the access request to the compressed data may be provided.

20 Claims, 13 Drawing Sheets

(56) References Cited

U.S. PATENT DOCUMENTS

| | | | |
|---|---|---|---|
| 2007/0050592 A1* | 3/2007 | Gschwind | G06F 9/30036 |
| | | | 711/201 |
| 2008/0189487 A1* | 8/2008 | Craske | G06F 12/0859 |
| | | | 711/125 |
| 2010/0161873 A1* | 6/2010 | Orbach | G06F 12/0802 |
| | | | 711/3 |
| 2010/0278443 A1* | 11/2010 | Pascali | G06T 3/0012 |
| | | | 382/233 |
| 2011/0271055 A1* | 11/2011 | O'Connor | G06F 12/0802 |
| | | | 711/118 |
| 2013/0275686 A1* | 10/2013 | Park | G06F 12/0831 |
| | | | 711/146 |
| 2014/0177959 A1 | 6/2014 | Bar-On | |
| 2015/0019834 A1* | 1/2015 | Loh | G06F 12/023 |
| | | | 711/208 |
| 2015/0348514 A1* | 12/2015 | Priel | G09G 5/36 |
| | | | 345/547 |
| 2016/0329013 A1* | 11/2016 | Han | G09G 3/20 |

* cited by examiner

FIG. 6
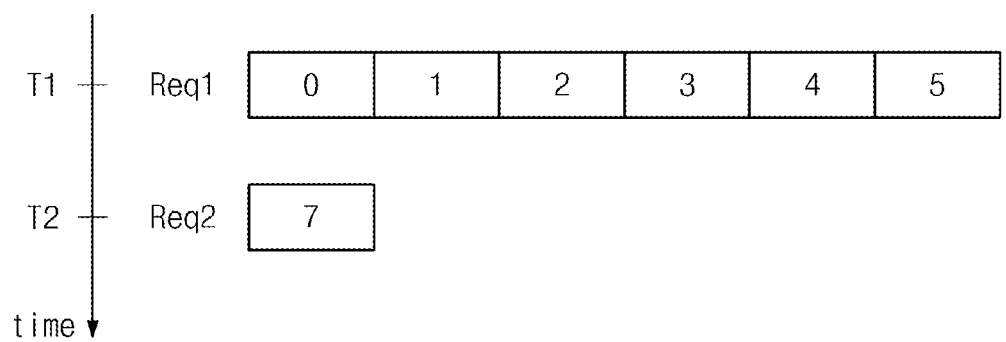
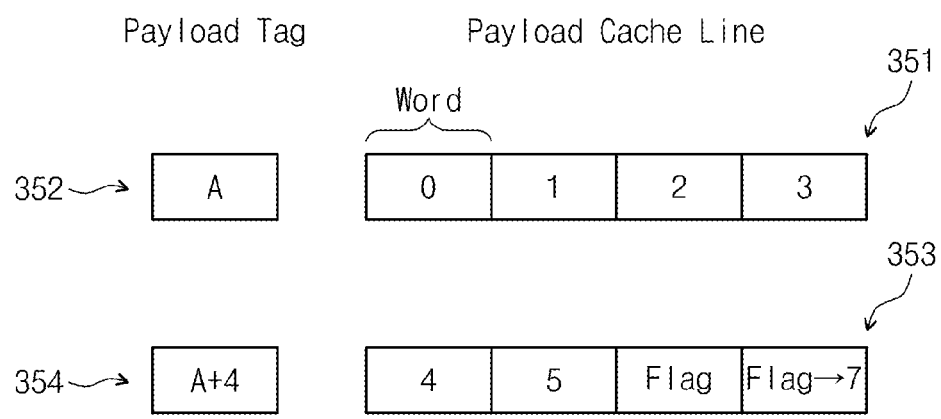

Packet data

Sub block

Packet data

DISPLAY DRIVING APPARATUS AND CACHE MANAGING METHOD THEREOF

CROSS-REFERENCE TO RELATED APPLICATIONS

A claim for priority under 35 U.S.C. § 119 is made to Korean Patent Application No. 10-2014-0169734 filed Dec. 1, 2014 and Korean Patent Application No. 10-2015-0141186 filed Oct. 7, 2015, in the Korean Intellectual Property Office, the entire contents of which are hereby incorporated by reference.

BACKGROUND

Example embodiments of the inventive concepts described herein relate to display driving apparatuses and/or cache managing methods thereof.

A flat panel display apparatus, which is lighter and smaller than a conventional Cathode Ray Tube (CRT), has been developed. The flat panel display apparatuses may include, for example, a Plasma Display Panel (PDP), a Liquid Crystal Display (LCD) apparatus, a field emission display apparatus, and an organic light emitting display apparatus.

As resolution of a flat panel display apparatus increases, the quantity of memory used by a display driving apparatus (e.g., circuit) increases, thereby causing an increase in power consumption.

Accordingly, a display driving apparatus configured to reduce power consumption and secure a memory bandwidth in spite of an increase in resolution of the display apparatus is being researched. The display driving apparatus compresses raw image data and stores the compressed data at a frame buffer. The display driving apparatus restores the compressed data to output it to the display apparatus.

SUMMARY

Some example embodiments of the inventive concepts provide display driving apparatus and/or cache managing methods thereof, which are capable of managing a cache efficiently, thereby improving performance of a decoder.

According to one aspect of example embodiments of the inventive concepts, a cache managing method of a display driving apparatus, which includes an encoder configured to generate compressed data by compressing raw data, a memory configured to store the compressed data, and a decoder including a payload cache and configured to restore the compressed data, includes requesting an access to the compressed data, and managing the payload cache using a linked list according to the access request to the compressed data.

When the access request to the compressed data is cache missed, the managing may include storing the requested compressed data at a plurality of words of a payload cache line using the linked list.

The managing may include storing the requested compressed data and pointer information indicating a word to be next linked at empty words of the payload cache line.

The managing may include storing at a payload tag a start address of the requested compressed data and pointer information indicating a word where data corresponding to the start address is stored may be stored.

The managing may include storing pieces of data, which corresponds to continuous addresses, and are free from among the compressed data, at words spaced from each other.

The compressed data may include a plurality of blocks. The decoder may be configured to read the compressed data from the memory by the block, and each of the blocks may occupy at least one minimum transfer units of a bus.

Portions of respective two blocks may be transferred through one minimum transfer unit.

The minimum transfer unit for transferring the portions of the respective two blocks may be stored at a first word, and a sequence of the two blocks in the first word may be further stored at the first word.

The blocks may include a first block and a second block. A last portion of the second block may be transferred through a first portion of the minimum transfer unit, a first portion of the first block may be transferred through the remaining portion of the minimum transfer unit. First pointer information indicating that a word corresponding to a start address of the first block is the first word may be stored at a tag where the start address of the first block is stored. The second block may be configured to store n words (n being a natural number of 2 or more) in order and second pointer information indicating that an n-th word is the first word may be stored at an $n-1^{st}$ word of words where the second block is stored.

The requesting an access to the compressed data may include providing the decoder with a decoding request signal having information about a start address and a burst length of the requested compressed data.

The burst length may be variable.

A number of words of the payload cache line may be fixed.

The payload cache may cache data by the word.

Data may be stored at some words of the payload cache line according to the access request to the compressed data and a flag indicating invalid data may be set to the remaining words.

According to another aspect of example embodiments of the inventive concepts, a cache managing method of a display driving apparatus, which includes an encoder configured to compress data, a memory configured to store the compressed data, and a decoder configured to restore the compressed data and having a payload cache line formed of the constant number of words, includes requesting an access to the compressed data, and caching, by the payload cache line, data by the word according to the access request to the compressed data.

The cache managing method may further include storing data at a portion of the words of the payload cache line according to the access request to the compressed data.

The storing of data may include setting a flag indicating invalid data to the remaining words of the payload cache line.

According to still another aspect of example embodiments of the inventive concepts, a display driving apparatus including an encoder configured to compress data, a memory configured to store the compressed data, and a decoder having a payload cache and configured to access the memory or the payload cache in response to a decoding request signal and restore the compressed data may be provided. The payload cache may be configured to be managed using a linked list.

The payload cache may include a tag configured to store a start address of the requested compressed data, and a payload cache line formed of a plurality of words and configured to store the requested compressed data.

When the decoding request signal is cache missed, the decoder may be configured to store the compressed data at words of the payload cache line using the linked list.

According to still another aspect of example embodiments of the inventive concepts, a cache managing method of a display driving apparatus includes generating, by encoder, compressed data by compressing raw data, storing the compressed data in a memory, requesting an access to the compressed data stored in the memory, and caching the accessed compressed data in a form of a linked list of at least some of a plurality of words, the plurality of words forming the payload cache line of a payload caches of a decoder.

The caching may further include storing at a payload tag of the payload cache both a start address of a first word from among the plurality of words and pointer information.

The pointer information may be one of information indicating a sequence between the plurality of words and information indicating a word to be connected next.

The caching may include filling some of the plurality of words of the payload cache line with the compressed data and setting the remaining ones of the plurality of the words with a flag indicating invalid data.

The cache managing method may further include transferring the requested compressed data having a plurality of blocks through a minimum transfer unit readable by a bus. Neighboring portions of at least one two consecutive ones from among the plurality of blocks may be transferred in a single minimum transfer unit.

According to an example embodiment of the inventive concepts, since a payload cache caches data by the word, it is possible to store compressed sub-blocks only requested by a decoding request signal at a payload cache line, thereby reducing loading of data onto a memory unnecessarily and allowing a payload cache to be managed efficiently.

According to an example embodiment of the inventive concepts, since a payload cache line is managed using a linked list, it is possible to cache data at the various numbers of words or read data therefrom using one tag. Thus, a payload cache is efficiently managed by reducing a waste of a payload tag and a payload cache line. Also, since the number of words corresponding to one payload tag is variously set, a burst length may be adjusted as desired.

According to an example embodiment of the inventive concepts, as blocks share a word, a capacity of a payload cache line may increase, thereby managing a payload cache more efficiently.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 6 is a diagram illustrating a payload cache managed in response to a decoding request signal, according to an example embodiment of the inventive concepts;

DETAILED DESCRIPTION

Figure 1:
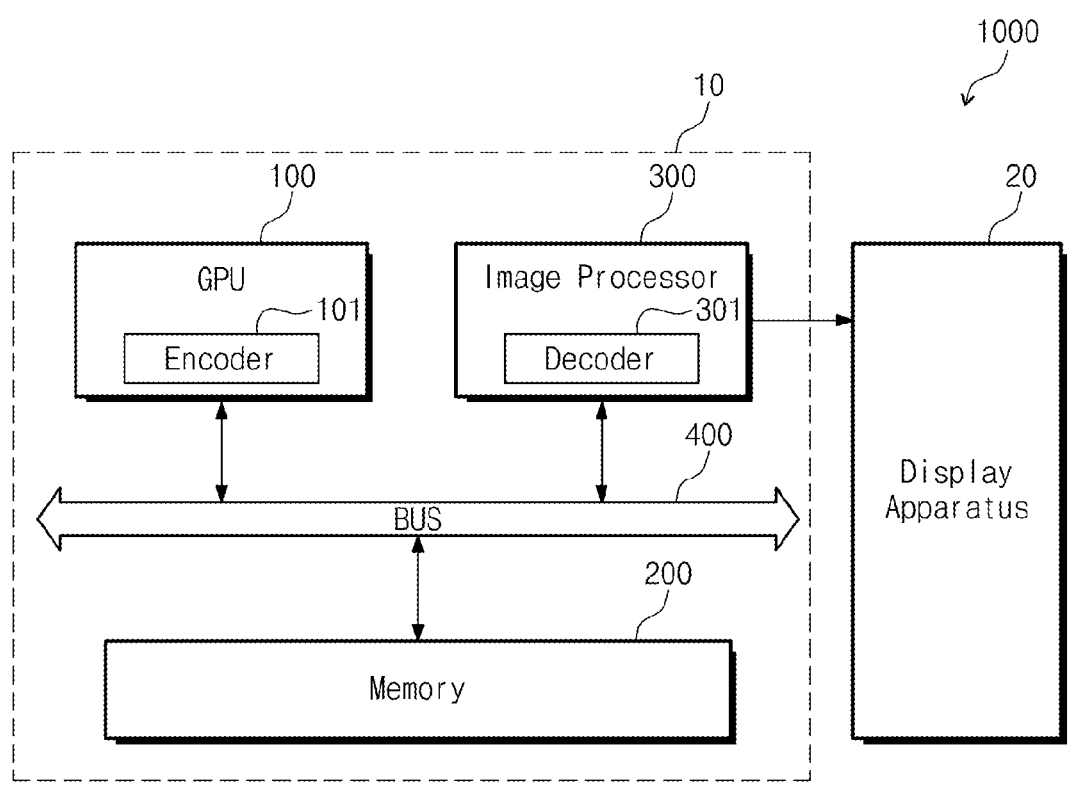
FIG. 1 is a block diagram schematically illustrating a display driving system according to an example embodiment of the inventive concepts.

Various example embodiments will be described in detail with reference to the accompanying drawings. The inventive concepts, however, may be embodied in various different forms, and should not be construed as being limited only to the illustrated example embodiments. Rather, these example embodiments are provided as examples so that this disclosure will be thorough and complete, and will fully convey the concept of the inventive concepts to those skilled in the art. Accordingly, known processes, elements, and techniques are not described with respect to some of the example embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "example" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Meanwhile, when it is possible to implement any example embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Expressions such as "at least one of," when preceding a list of elements, modify the entire list of elements and do not modify the individual elements of the list.

Example embodiments of inventive concepts can be embodied as hardware, software, or combinations of hardware and software. Example embodiments of inventive concepts can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments according to example embodiments of inventive concepts can be construed by programmers having ordinary skill in the art to which example embodiments of inventive concepts pertain.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a display driving system 1000 according to an example embodiment of the inventive concepts.

Referring to FIG. 1, a display driving system 1000 contains a display driving apparatus 10 and a display apparatus 20.

The display driving apparatus 10 may include a graphics processing unit (GPU) 100, a memory 200, an image processor 300, and a bus 400.

The GPU 100 may contain an encoder 101. The GPU 100 may generate raw image data. The GPU 100 may compress the raw data using the encoder 101 and generate compressed data.

A variety of data may be loaded onto the memory 200. For example, an operating system and/or device drivers for driving hardware may be loaded onto the memory 200. For example, a frame buffer region for storing compressed data may be assigned in the memory 200. The memory 200 may manage addresses of compressed data stored therein.

The image processor 300 may include a decoder 301. The decoder 301 may restore compressed data read from the memory 200 and generate restoration data. The image processor 300 may modulate the restoration data to be suitable for the specification of the display apparatus 20 and output the modulated data to the display apparatus 20.

The bus 400 may provide a data communication path between the GPU 100 and the memory 200 and between the image processor 300 and the memory 200. The compressed data may be transmitted and received through the bus 400 by the packet. The bus 400 may be implemented in the form of Network-On-Chip (NOC) using a network technology. For example, the bus 400 may be implemented in the form of NOC that is based on ARM® AMBA® bus protocol. The AMBA® bus types may include AHB (Advanced High-Performance Bus), APB (Advanced Peripheral Bus), and AXI (Advanced eXtensible Interface). The AXI protocol may include advanced functions such as multiple outstanding address and data interleaving. It is apparent to one skilled in the art that the bus is not limited to the above-described illustration.

The display apparatus 20 may receive the modulated restoration data and display an image corresponding to the modulated restoration data. The display apparatus 20 may include, for example, organic light emitting display apparatus, liquid crystal display apparatus, plasma display apparatus, electrophoretic display apparatus, or electro-wetting display apparatus.

Figure 2:
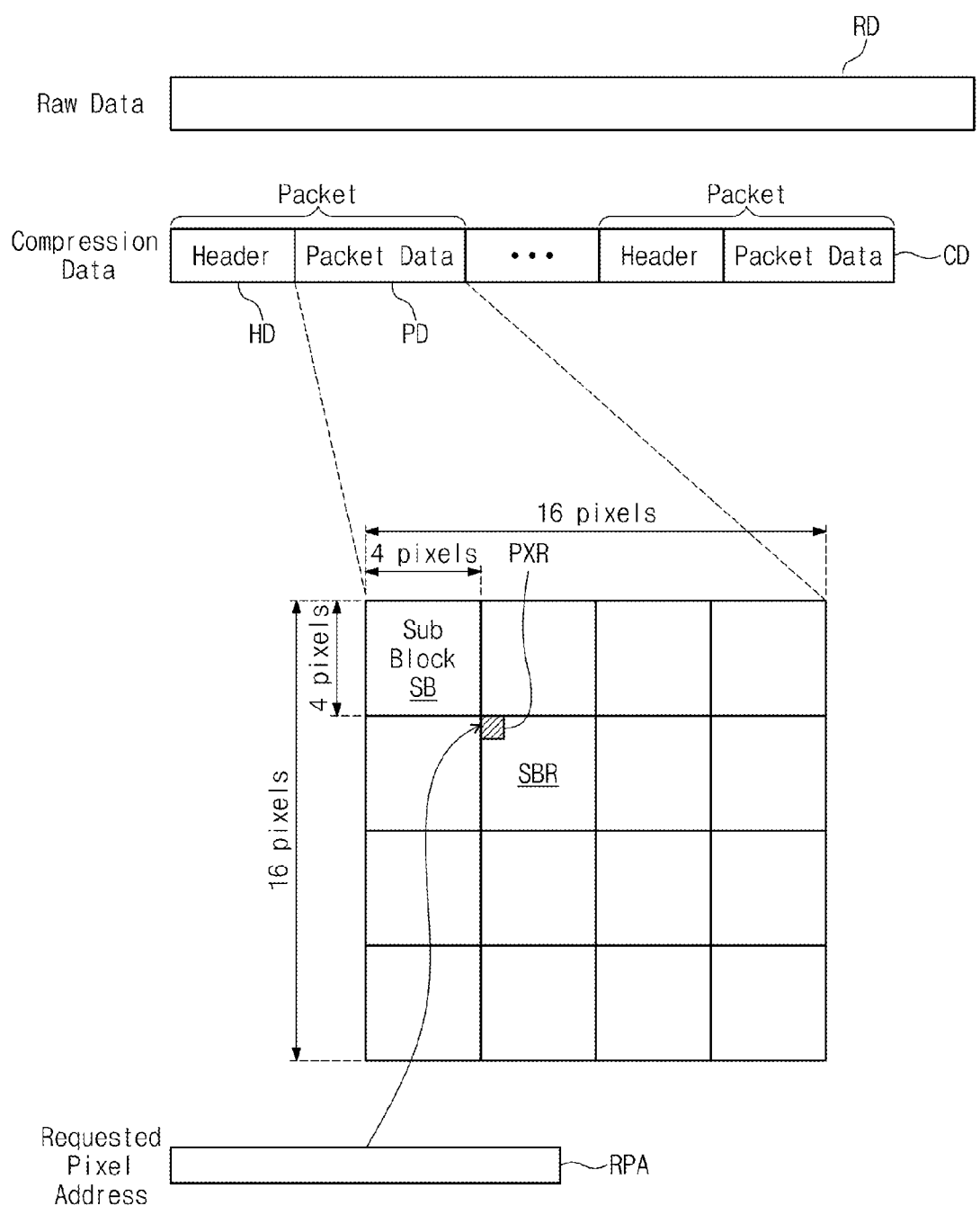
FIG. 2 is a diagram illustrating raw data input to an encoder in FIG. 1 and compressed data output therefrom.

FIG. 2 is a diagram illustrating raw data input to the encoder 101 in FIG. 1 and compressed data output therefrom.

Referring to FIGS. 1 and 2, the encoder 101 may generate compressed data CD by compressing raw data RD using one of a plurality of encoding methods. The raw data RD may include pieces of frame data. The frame data may include pieces of pixel data corresponding to resolution of the display apparatus 20.

In an example embodiment, an encoder 101 may quantize each video frame. In an embodiment, the encoder 101 may be an entropy encoder. The entropy encoder may use a context adaptive variable length coding (CAVLC). In an example embodiment, the encoder 101 may perform an encoding based on compression standards of a video frame such as MPEG-1, MPEG-2, MPEG-4, H.263, or H.264. The encoded data may be used as quantized data, data converted into not a spatial domain but another domain, compressed data, or a combination thereof.

The encoder 101 may compress the raw data RD by the sub-block SB. For example, the sub-block SB may be formed of data of four-by-four pixels arranged in a matrix form.

The compressed data CD may be sent to a memory 200 through the bus 400 by the packet. One packet in the compressed data CD may include packet data PD and a header HD.

The packet data PD may include a plurality of compressed sub-blocks SB. For example, the packet data PD may include four-by-four compressed sub-blocks SB (or 16-by-16 compressed pixels).

The header HD may include information about a sequence of compressed sub-blocks SB in the packet data PD and information about the size of each of compressed sub-blocks SB as header information. The header information may further include a start address of total packet data (for example, a start address of a first sub-block).

Because compressed data CD stored at the memory 200 is data obtained by compressing the raw data RD by the sub-block SB, an image processor 300 may restore the compressed data CD by the sub-block SB. For example, when an access to specific pixel data PXR is requested, the image processor 300 may refer to an address RPA of the specific pixel data PXR to identify an address of a sub-block SBR including the access-requested pixel data PXR. The image processor 300 may read sub-block SBR including the access-requested pixel data PXR from the memory 200 and restore the read sub-block SBR. An access request may further include pixel size information to be read. Here, the pixel size information may be the number of a block for a sub-block.

Figure 3:
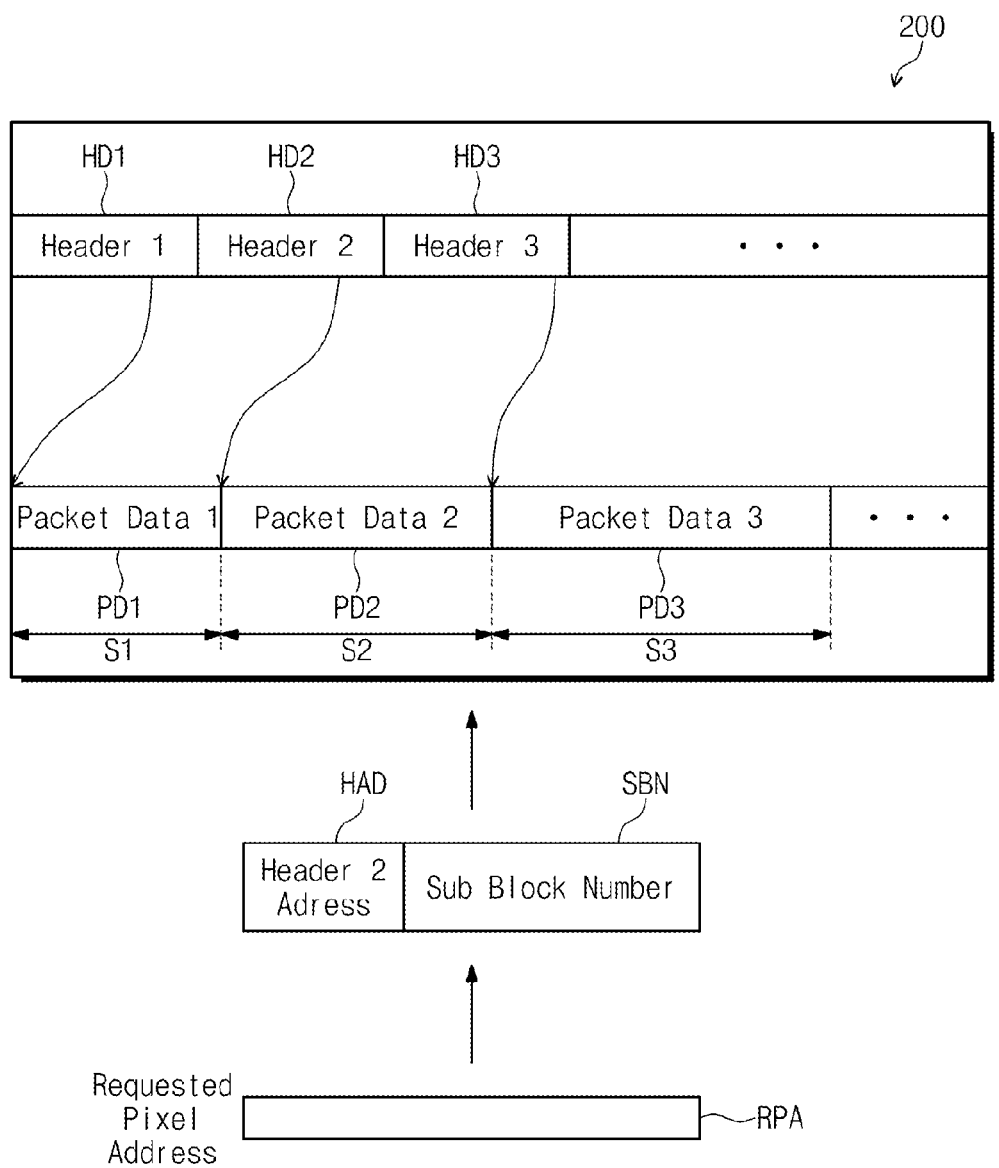
FIG. 3 is a diagram illustrating compression data stored in a memory, according to an example embodiment of the inventive concepts.

FIG. 3 is a diagram illustrating compression data stored in a memory, according to an example embodiment of the inventive concepts. A process of approaching a sub-block including specific pixel data in a memory 200 based on an access request about specific pixel data will be described with reference to FIG. 3.

Headers HD1 to HD3 and packet data PD1 to PD3 may be stored in the memory 200. FIG. 3 illustrates the first to third headers HD1 to HD3 and the first to third packet data PD1 to PD3.

The headers HD1 to HD3 may have information about the corresponding packet data PD1 to PD3, respectively. For example, the first to third headers HD1 to HD3 may have information about the first to third packet data PD1 to PD3, respectively.

Each of the first to third packet data PD1 to PD3 may have a variable size based on a compression ratio. FIG. 3 illustrates, for example, that the first packet data PD1 has a first size S1, the second packet data PD2 has a second size S2 different from the first size S1, and the third packet data PD3 has a third size S3 different from the first size S1 and/or the second size S2.

Each of the first to third headers HD1 to HD3 may have a start address of a storage order of compressed sub-blocks, a size of each of the compressed sub-blocks, and corresponding packet data as header information.

The headers HD1 to HD3 and the packet data PD1 to PD3 may not be continuously stored in the memory 200. Although the headers HD1 to HD3 and the packet data PD1 to PD3 are not continuously stored, because each of the headers HD1 to HD3 have the start address of the corresponding packet data, an image processor 300 may access a sub-block including pixel data in which is an access is requested based on the header information.

When there is an access request about specific pixel data, the image processor 300 may convert an address RPA of specific pixel data into a header address HAD and a sub-block number SBN.

The header address HAD may be an address of a header that has information of packet data including specific pixel data. The sub-block number SBN may have information about a number corresponding to a sub-block in which specific pixel data in packet data is stored.

FIG. 3 illustrates, for example, that the header address HAD is an address of the second header HD2. The image processor 300 may access the second header HD2 based on the header address HAD and a sub-block number SBN and may access the second packet data PD2 based on the header information of the second header HD2.

Figure 4:
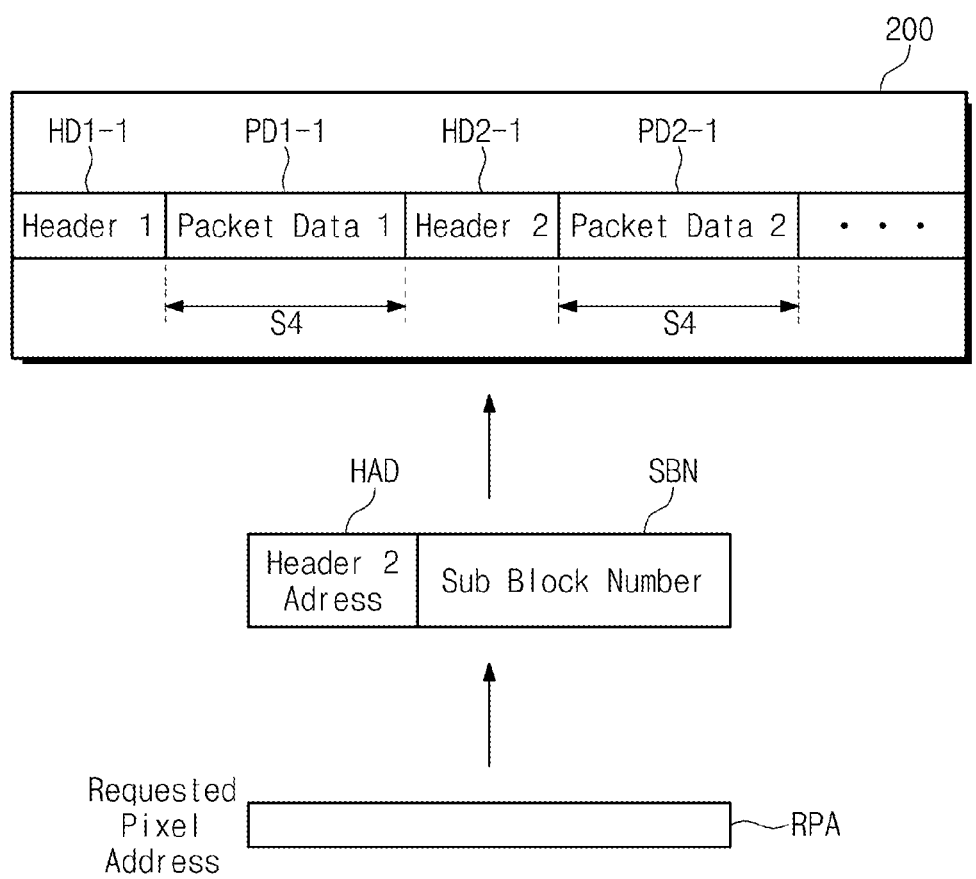
FIG. 4 is a diagram illustrating compression data stored in a memory, according to an example embodiment of the inventive concepts.

FIG. 4 is a diagram illustrating compression data stored in a memory, according to an example embodiment of the inventive concepts. A process of approaching a sub-block including specific pixel data in the memory 200 based on an access request about specific pixel data will be described with reference to FIG. 4.

Headers HD1-1 to HD2-1 and packet data PD1-1 to PD2-1 may be stored in the memory 200. FIG. 4 illustrates the first and second headers HD1-1 and HD2-1 and the first and second packet data PD1-1 and PD2-1.

The headers HD1-1 and HD2-1 may have information about the corresponding packet data PD1-1 and PD2-1. For example, the first and second headers HD1-1 and HD2-1 may have information about the first and second packet data PD1-1 and PD2-1, respectively.

The first and second packet data PD1-1 and PD2-1 may have the same size S4.

Each of the first and second headers HD1-1 and HD2-1 may have a storage order of compressed sub-blocks and a size of each of the compressed sub-blocks as header information.

The headers HD1-1 and HD2-1 and the packet data PD1-1 and PD2-1 may be continuously stored in the memory 200. For example, the first header HD1-1 and the first packet data PD1-1 may be continuously stored, and the second header HD2-1 and the second packet data PD2-1 may be continuously stored. Because the headers HD1-1 and HD2-1 and the packet data PD1-1 and PD2-1 which correspond to each other are continuously stored, the headers HD1-1 and HD2-1 may not need a start address of packet data.

When there is an access request about specific pixel data, the image processor 300 may convert an address RPA of specific pixel data into a header address HAD and a sub-block number SBN.

The header address HAD may be an address of a header that has information of packet data including specific pixel data. The sub-block number SBN may have information about a number corresponding to a sub-block in which specific pixel data in packet data is stored.

FIG. 4 illustrates, for example, that the header address HAD is an address of the second header HD2. The image processor 300 may access the second header HD2 based on the header address HAD and a sub-block number SBN and may access the second packet data PD2 based on the header information of the second header HD2.

Figure 5:
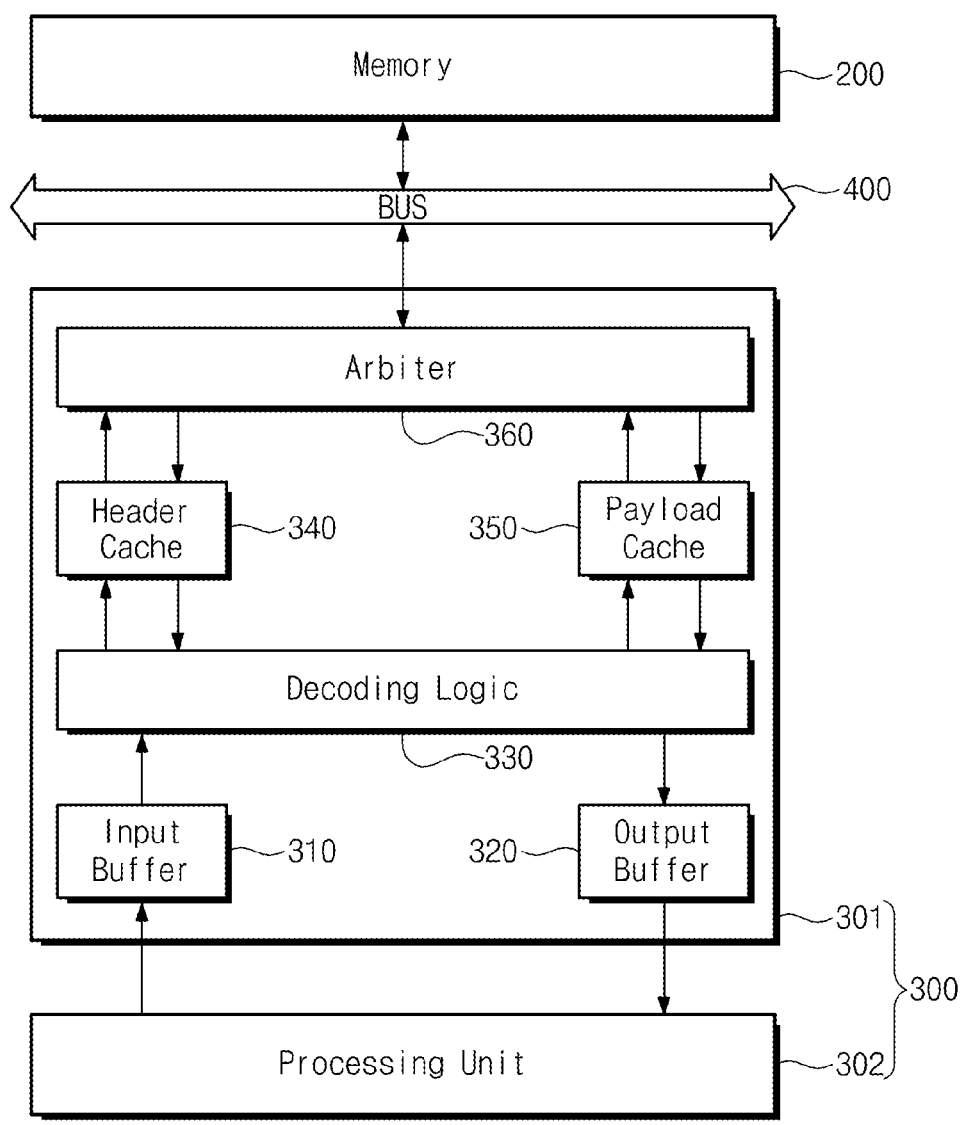
FIG. 5 is a block diagram schematically illustrating a portion of a display driving apparatus shown in FIG. 1.

FIG. 5 is a block diagram schematically illustrating a portion of a display driving apparatus shown in FIG. 1.

Referring to FIGS. 1 and 5, the image processor 300 further includes a processing unit 302.

The processing unit 302 may request restoring of compressed data at the decoder 301 and receive restored data. The processing unit 302 may execute a scaling process for fitting the restored data to resolution of a display apparatus 20. Further, the processing unit 302 may rotate the restored data to be suitable for a screen setting angle of the display apparatus 20.

The decoder 301 may include, for example, an input buffer 310, an output buffer 320, decoding logic 330, and an arbiter 360.

The input buffer 310 may store a decoding request signal from the processing unit 302. The input buffer 310 may provide the decoding request signal to the decoding logic 330 at appropriate timing.

The output buffer 320 may store data that the decoding logic 330 restores. The output buffer 320 may output the restored data to the processing unit 302 at appropriate timing.

A cache may include a header cache 340 and a payload cache 350.

The header cache 340 may include a header tag and a header cache line. An address of header information may be stored at the header, and header information corresponding to an address that the header tag denotes may be stored at the header cache line.

The payload cache 350 may include a payload tag and a payload cache line. Stored at the payload tag may be an address of a compressed sub-block that is requested referring to the header. Stored at the payload cache line may be a compressed sub-block having an address that the payload tag denotes.

The decoding logic 330 may restore an access-requested compressed data by the sub-block in response to the decoding request signal. For example, the decoding request signal may be a request directing restoring of the specific number of compressed sub-blocks from a specific position in packet data. The decoding request signal may include a position of a compressed sub-block requested and information about the number of compressed sub-blocks. The decoding request signal may include information about, for example, a start address and a burst length of the compressed sub-block requested.

The decoding logic 330 may search for a header tag of the header cache 340 to determine whether an address of a packet requested or an address of a header requested exists in the header cache 340. A cache hit occurs when the address requested is found. When the cache hit occurs, the decoding logic 330 reads corresponding header information from the header cache line. A cache miss occurs when the address requested is not found. When the cache miss occurs, the decoding logic 330 accesses the memory 200 through the bus 400 to read header information of the header requested and store the header information at the header cache 340.

The decoding logic 330 may search for the payload tag of the payload cache 350 to determine whether a compressed sub-block corresponding to the header information exists in the payload cache. A cache hit occurs when a start address of the compressed sub-block corresponding to the header information read from the payload tag is found. In this case, the decoding logic 330 reads the compressed sub-block from the payload cache line. A cache miss occurs when a start address of the compressed sub-block corresponding to the header information read from the payload tag is not found. In this case, the decoding logic 330 accesses the memory 200 through the bus 400 to read the compressed sub-block requested corresponding to the header information and stores the compressed sub-block thus read at the payload cache 350.

The arbiter 360 may grant a priority to one of the header cache 340 and the payload cache 350 at a specific time. The header cache 340 and the payload cache 350 may access the memory 200 through the bus 400 under a control of the arbiter 360. Further, the header cache 340 and the payload cache 350 may receive access-requested data from the memory 200 through the bus 400 under a control of the arbiter 360.

FIG. 6 is a diagram illustrating a payload cache managed in response to a decoding request signal, according to an example embodiment of the inventive concepts.

Referring to FIGS. 5 and 6, a length of a payload cache line may be fixed. For example, one payload cache line may be formed of a plurality of words. FIG. 6 shows an example embodiment in which one payload cache line is formed of four words. The words in the payload cache line may have the same size.

A payload cache 350 may cache data by the payload cache line. For example, one payload cache line may be filled with data in response to a decoding request signal even when it is not desired to fill the payload cache line with data. Because the payload cache line is filled with data that is not requested by the decoding request signal, thereby causing undesired excessive loading of data from memory. Thus, the payload cache 350 may be inefficiently managed.

According to an example embodiment of the inventive concepts, the payload cache 350 caches data by the word. The payload cache 350 stores data requested by the decoding request signal at a payload cache line. Accordingly, data is stored at some words of the payload cache line in response to the decoding request signal, and a flag indicating invalid data is set to the remaining words.

For example, the decoding logic 330 receives a first decoding request signal Req1 at T1 and a cache miss occurs. The first decoding request signal Req1 may be a signal requesting data stored at addresses A to (A+5). Data corresponding to addresses A to (A+3) is stored at a first payload cache line 351, and the address A is stored at a first payload tag 352. Data corresponding to addresses (A+4) and (A+5) is stored at a second payload cache line 353, and the address A+4 is stored at a second payload tag 354. Flag are set to words corresponding to addresses (A+6) and (A+7) of the second payload cache line 353.

The decoding logic 330 may receive a second decoding request signal Req2 at T2, at which a cache miss occurs. The second decoding request signal Req2 may be a signal requesting data stored at an address (A+7). Data corresponding to the address (A+7) is stored at the second payload cache line 353.

According to an example embodiment of the inventive concepts, since a payload cache caches data by the word, only compressed sub-blocks corresponding to a decoding request signal may be stored at a payload cache line. Thus, undesirable loading of data from a memory may be minimized or prevented and thus a payload cache may be managed more efficiently. In other words, performance of a decoder 301 may be improved.

Figure 7:
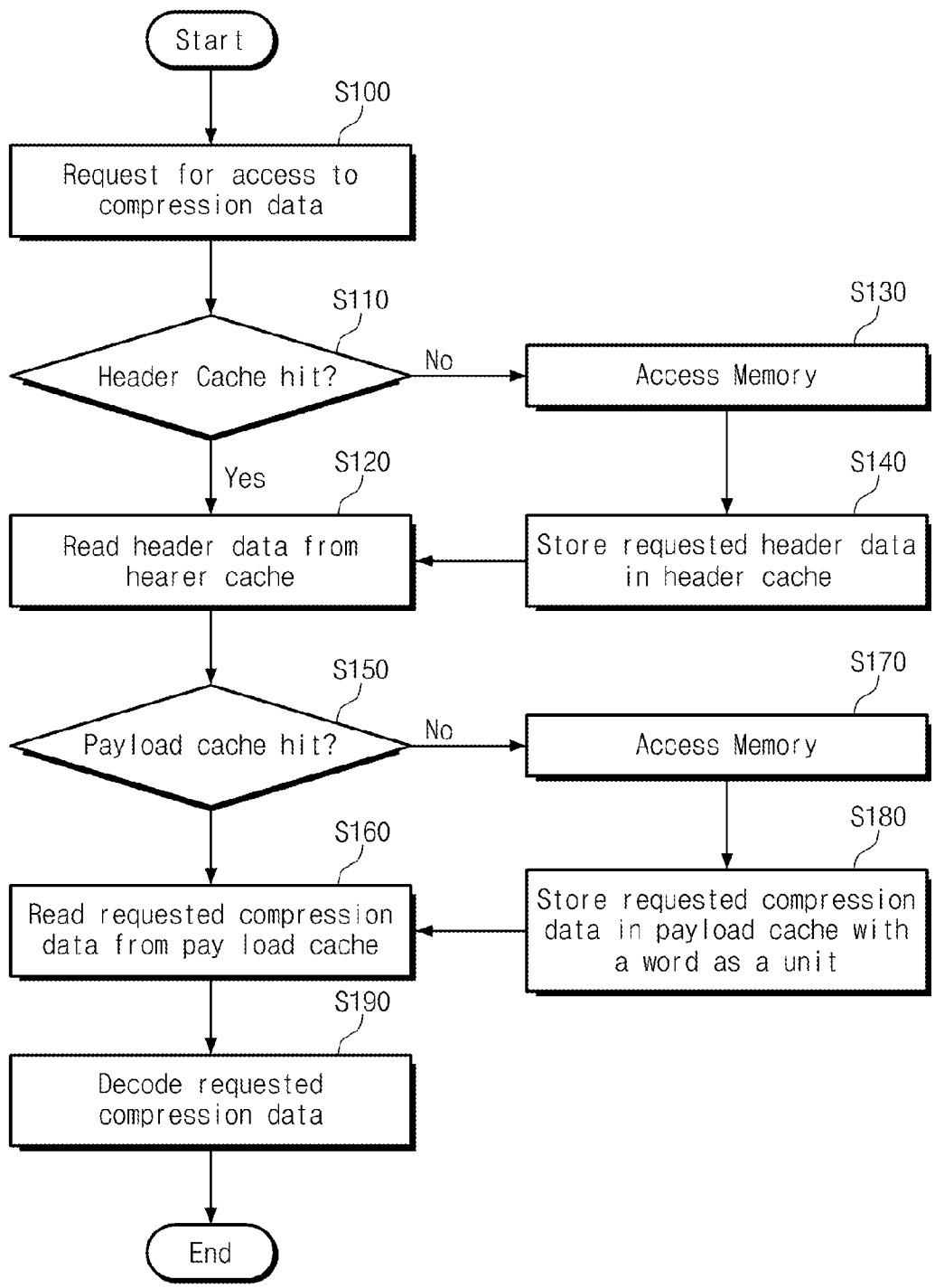
FIG. 7 is a flowchart illustrating a cache managing method of a display driving apparatus according to an example embodiment of the inventive concepts.

FIG. 7 is a flowchart illustrating a cache managing method of a display driving apparatus according to an example embodiment of the inventive concepts.

Referring to FIGS. 5 to 7, in step S110, an access to compressed data is requested. The decoder 301 receives a decoding request signal through the input buffer 310. The decoding request signal may include a start address and a burst length of the requested compressed data.

In step S110, searching for a header tag of the header cache 340 is performed to determine whether a start address of the requested compressed data exists in the header cache 340. If a cache hit occurs, in step S120, the decoding logic 330 reads header information of the requested compressed data from a header cache line of the header cache 340. If a cache miss occurs, in step S130, the decoding logic 330 accesses the memory 200; and in step S140, the decoding logic 330 reads header information of the requested compressed data from the memory 200 and stores the read header information at the header cache 340.

In step S150, searching for a payload tag of the payload cache 350 is performed to determine whether compressed data corresponding to the read header information exists in a payload cache. If a cache hit occurs, the decoding logic 330 reads the requested compressed data corresponding to the header information from the payload cache line. If a cache miss occurs, in step S170, the decoding logic 330 accesses the memory 200; and in step S180, the decoding logic 330 reads the requested compressed data corresponding to the header information from the memory 200 and stores the read data at the payload cache 350.

In step S180, the payload cache line may cache data by the word. That is, data may be stored at some words of the payload cache line, and a flag indicating invalid data may be set to the remaining words thereof.

In step S190, the decoding logic 330 restores the requested compressed data. The decoder 301 outputs the restored data through an output buffer 320.

Figure 8:
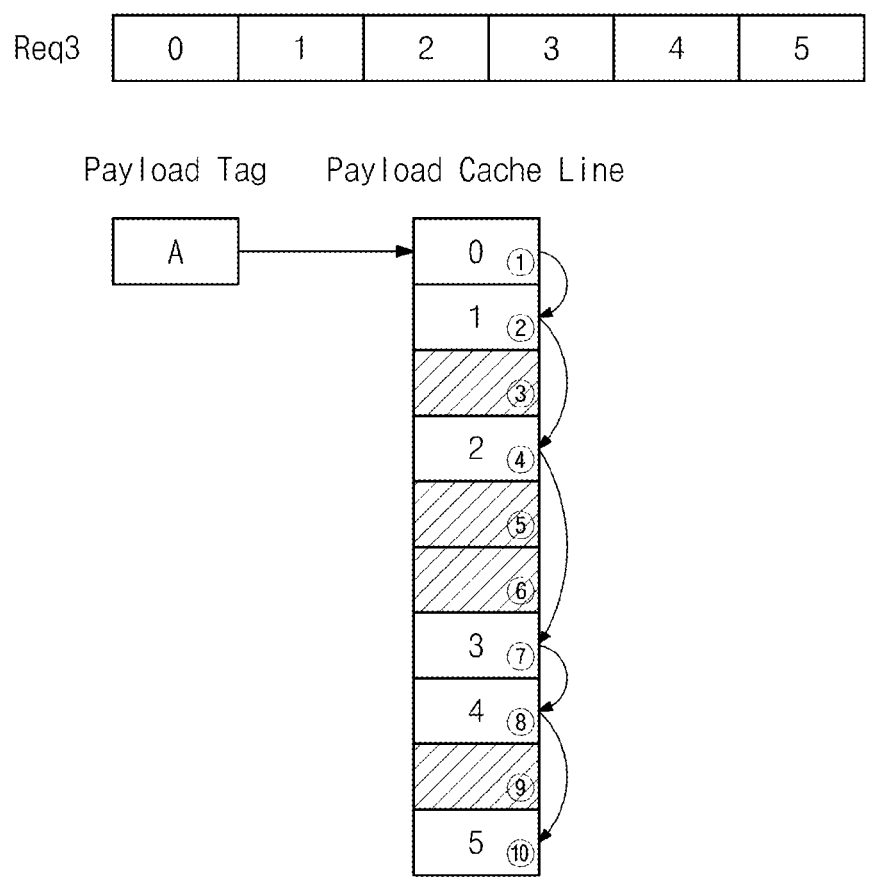
FIG. 8 is a diagram illustrating a payload cache managed in response to a decoding request signal, according to another example embodiment of the inventive concepts.

FIG. 8 is a diagram illustrating a payload cache managed in response to a decoding request signal, according to another example embodiment of the inventive concepts.

Referring to FIGS. 5 and 8, the payload cache line may be managed using a linked list. The payload cache line may be managed such that the number of words corresponding to a tag is changed. A payload cache 350 may read the various numbers of words linked through different pointers from a cache hit tag. Further, the payload cache 350 stores the various numbers of words using a tag. Because a sequence of words where data is stored may be denoted by a pointer, a position of a word where data is stored may not be considered. For example, FIG. 8 illustrates a case in which the payload cache line is formed of 10 words ① to ⑩.

For example, the decoding logic 330 may receive a third decoding request signal Req3 and a cache miss may occur. The third decoding request signal Req3 may be a signal requesting compressed data stored at addresses A to (A+5). In FIG. 8, hatched boxes means that data is previously stored therein.

Requested compressed data corresponding to the addresses A to (A+5) may be stored at the payload cache line using a linked list. Requested compressed data corresponding to the addresses A to (A+5) may be stored at empty words of the payload cache line, and pointer information may be stored at corresponding words where the requested compressed data are stored. The pointer information may indicate a word to be connected next.

Data corresponding to the address A and pointer information indicating that a next word is the second word (②) are stored at the first word (①). Data corresponding to the address (A+1) and pointer information indicating that a next word is the fourth word (④) are stored at the second word (②). Data corresponding to the address (A+3) and pointer information indicating that a next word is the eighth word (⑧) are stored at the fourth word (⑦). Data corresponding to the address (A+4) and pointer information indicating that a next word is the tenth word (⑩) are stored at the fifth word (⑧). Data corresponding to the address (A+5) and pointer information indicating that a next word does not exist are stored at the sixth word (⑩).

Data corresponding to continuous addresses may not be stored at words adjacent to each other. For example, data corresponding to continuous addresses may be stored at words spaced apart from each other. For example, data corresponding to an address (A+2) may be stored at the second word (②), and data corresponding to an address (A+3) may be stored at the fourth word (④) spaced apart from the second word (②).

An address A and pointer information may be stored at the payload tag. In an example embodiment, the pointer information stored at the payload tag may indicate that data corresponding to the address A is stored at the first word (①) and the number of words where data corresponding to addresses A to (A+5) is stored. However, the scope and spirit of the inventive concepts may not be limited thereto. For example, the pointer information stored at the payload tag may indicate that data corresponding to the address A is stored at the first word (①) and data corresponding to the address (A+5) is stored at the tenth word (⑩).

In the event that a length of the payload cache line is fixed, at least two or more payload tags are used when a length of write or read-requested compressed data is longer than that of the payload cache line. Thus, a waste of the payload tag may occur. Because the number of tags related to requested compressed data is two or more, two or more access operations may be performed. Accordingly, a burst length for one access operation may be shortened. Thus, a payload cache resource may be wasted when undesired data is cached at the payload cache line or data is not stored at some words of the payload cache line.

According to an example embodiment of the inventive concepts, because a payload cache line is managed using a linked list, caching data at the various numbers of words or reading data therefrom using one tag may become possible. Thus, the payload cache 350 may be efficiently managed by reducing a waste of the payload tag and/or the payload cache line. Further, because the number of words corresponding to one payload tag is variously set, a burst length may be adjusted to have a desired length.

Figure 9A:
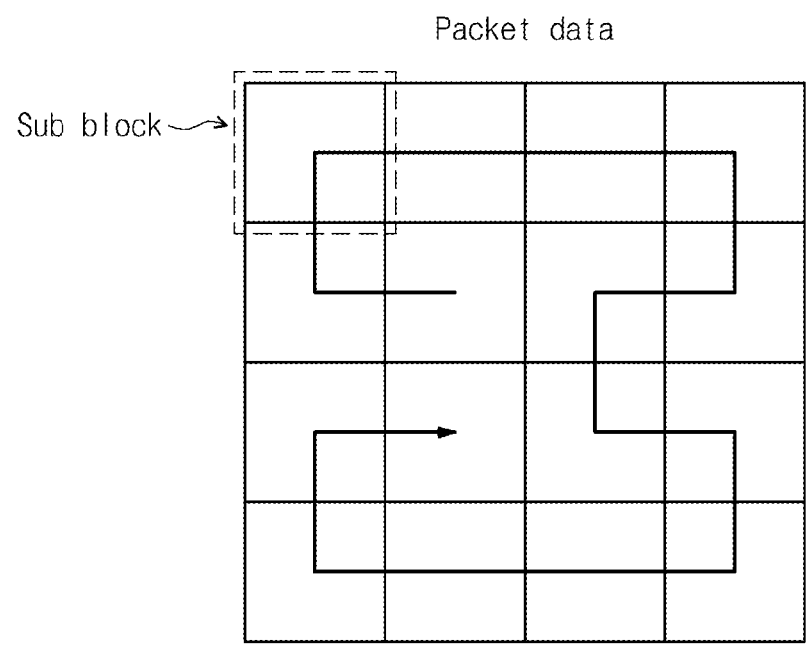
FIG. 9A is a diagram illustrating a sequence of storing compressed sub-blocks constituting a piece of packet data at a memory.
Figure 9B:
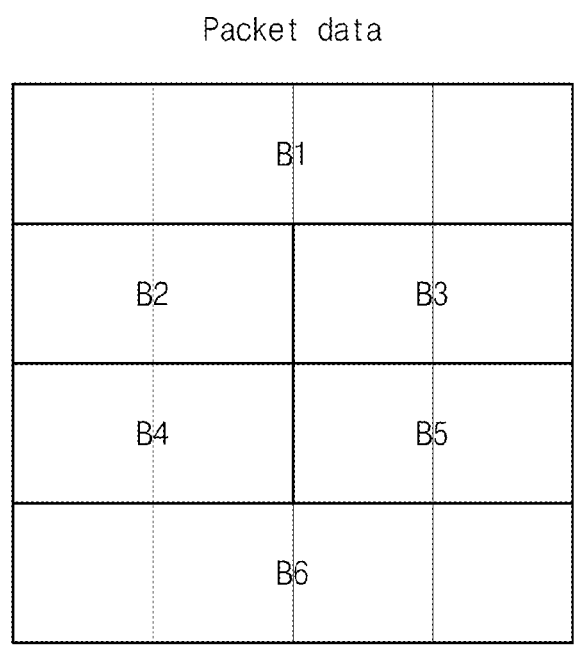
FIG. 9B is a diagram illustrating a unit block sequence for reading a piece of packet data from a memory.

FIG. 9A is a diagram illustrating a sequence of storing compressed sub-blocks constituting a piece of packet data at the memory 200. FIG. 9B is a diagram illustrating a unit block sequence for reading a piece of packet data from the memory 200.

Referring to FIG. 9A, compressed sub-blocks in packet data are stored at the memory 200 according to an arrow. A sequence in which sub-blocks of the packet data are stored may be different from a sequence in which sub-blocks of the packet data are read. A unit by which sub-blocks of the packet data are stored may be different from a unit by which sub-blocks of the packet data are read. Referring to FIG. 9B, the packet data may be read by the block. The block may include at least one or more sub-blocks. The size of the block may be variously set. The packet data may be divided into first to sixth blocks B1 to B6. The packet data may be read from the memory 200 according to a sequence where the first block B1 is first read and the sixth block B6 is lastly read.

Figure 10:
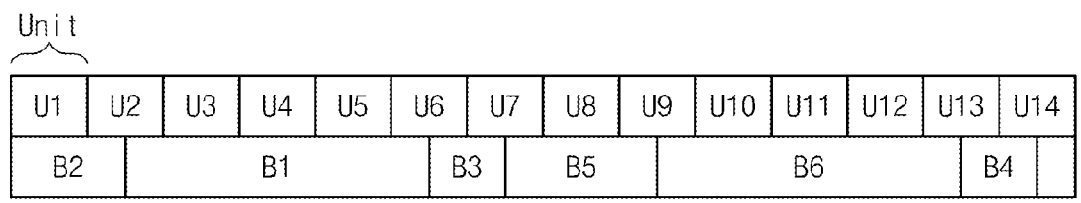
FIG. 10 is a diagram illustrating an example where first to sixth blocks are divided by a minimum transfer unit readable by a bus.

FIG. 10 is a diagram illustrating an example where first to sixth blocks B1 to B6 are divided by a minimum transfer unit readable by a bus 400.

Referring to FIGS. 9A, 9B, and 10, the minimum transfer unit may have a size equal to or smaller than each of words of a payload cache line. Accordingly, data having the minimum transfer unit may be stored at each of words of the payload cache line.

The first to sixth blocks B1 to B6 are read using each of 1st to 14th units U1 to U14 as the minimum transfer unit. The number of minimum transfer units that each block occupies may vary with a compression ratio. Each of the first to sixth blocks B1 to B6 may occupy at least one or more minimum transfer units.

Because the sizes of first to sixth blocks B1 to B6 vary with a compression ratio, boundaries between the first to sixth blocks B1 to B6 may not coincide with boundaries between the 1st to 14th units U1 to U14. Thus, a portion of each of two blocks may correspond to one minimum transfer unit for transmission.

The second block B2 may be read using the first unit U1 and the first half of the second unit U2. The first block BL1 may be read using the remaining half of the second unit U2, the third to fifth units U3 to U5, and the first half of the sixth unit U6. The third block B3 may be read using the remaining half of the sixth unit U6 and the first half of the seventh unit U7. The fifth block B5 may be read using the remaining half of the seventh unit U7, the eighth unit U8, and the first half of the ninth unit U9. The sixth unit U6 may be read using the remaining half of the ninth unit U9, tenth to twelfth units U10 to U12, and the first half of the thirteenth unit U13. The fourth block B4 may be read using the remaining half of the thirteenth unit U13 and the first half of the fifteenth unit U14.

Figure 11:
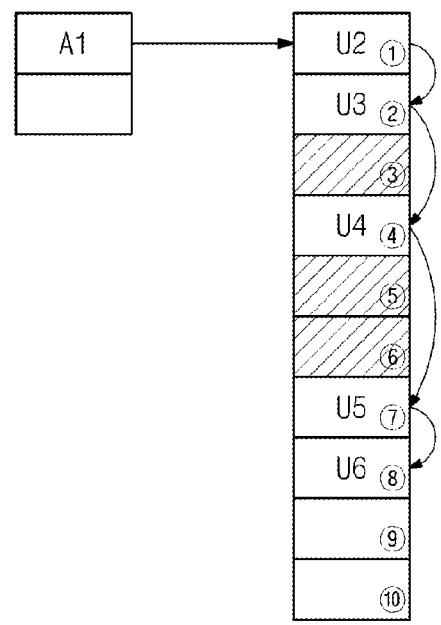
FIG. 11 is a diagram illustrating a payload cache managed when a first block is requested.

FIG. 11 is a diagram illustrating a payload cache managed when a first block is requested.

Referring to FIGS. 10 and 11, the payload cache line is managed using a linked list. This is described with reference to FIG. 8, and a detailed description thereof is thus omitted.

The first block B1 may be stored at empty words of the payload cache line, and pointer information may also be stored at the words where the first block B1 is stored. For example, the first block B1 may be read from a memory 200 using second to sixth units U2 to U6, and the second to sixth units U2 to U6 may be stored at empty words of the payload cache line. For example, the second unit U2 may be stored at the first word (①), the third unit U3 at the second word (②), and the fourth unit U4 at the fourth word (④). The fifth unit U5 may be stored at the seventh word (⑦) and the sixth unit U6 at the eighth word (⑧).

Pointer information indicating that a next word is the second word (②) may be stored at the first word (①). Pointer information indicating that a next word is the fourth word (④) may be stored at the second word (②). Pointer information indicating that a next word is the seventh word (⑦) may be stored at the fourth word (④). Pointer information indicating that a next word is the eighth word (⑧) may be stored at the seventh word (⑦).

Information indicating that the second unit U2 is stored at a portion of the second block B2 and a portion of the first block B1 in order may be stored at the first word (①). Information indicating that the sixth unit U6 is stored at a portion of the first block B1 and a portion of the third block B3 in order may be stored at the eighth word (⑧).

A start address A1 of the first block B1 and pointer information may be stored at a payload tag. The pointer information may indicate that data corresponding to the start address of the first block B1 is stored at the first word (①) and the number of words where data corresponding to the first block B1 is stored.

Figure 12:
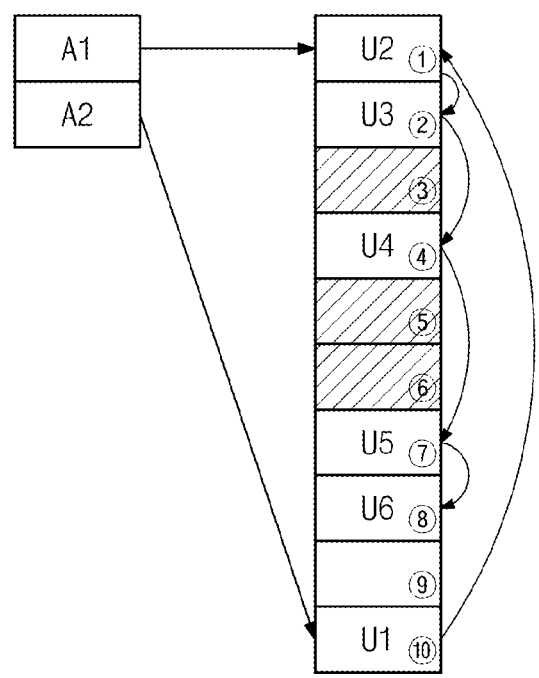
FIG. 12 is a diagram illustrating a payload cache managed when a first block and a second block are requested.

FIG. 12 is a diagram illustrating a payload cache managed when a first block and a second block are requested.

Referring to FIGS. 10 and 12, the second block B2 may be stored at empty words of the payload cache line, and pointer information may also be stored at the words where the second block B2 is stored. The second block B2 may be read from a memory 200 using first and second units U1 and U2. The second block B2 may be stored at n words (n being a natural number of 2 or more) in order. For example, the second block B2 may be stored at a tenth word (⑩) and a first word (①) in order.

The first unit U1 is stored at an empty word of the payload cache line. For example, the first unit U1 may be stored at the tenth word (⑩). Because the second unit U2 is previously stored at the first word (①) according to a request of the first block B1, the second unit U2 may not be stored at the payload cache line.

Pointer information indicating that an n-th word is the first word (①) is stored at an n-1$^{st}$ word of the words where the second block B2 is stored. For example, pointer information indicating that a next word is the first word (①) is stored at the tenth word (⑩). If an address A2 is found from a payload tag, the decoding logic 330 may read the second block B2 by accessing the tenth word (⑩) and the first word (①) that the tenth word (⑩) indicates.

According to an example embodiment of the inventive concepts, because the first and second blocks B1 and B2 share the second word (②), a usable capacity of the payload cache line may increase. In other words, a payload cache 350 can be efficiently managed.

Figure 13:
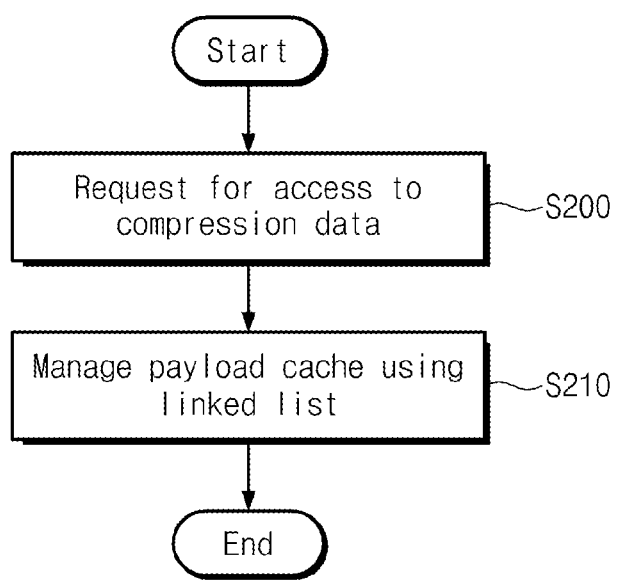
FIG. 13 is a flowchart illustrating a cache managing method of a display driving apparatus according to an example embodiment of the inventive concepts.

FIG. 13 is a flowchart illustrating a cache managing method of a display driving apparatus according to an example embodiment of the inventive concepts.

Referring to FIGS. 5 and 8 to 13, in step S200, an access to compressed data may be requested. The decoder 301 may receive a decoding request signal through the input buffer 310. The decoding request signal may have a start address and a burst length of requested compressed data.

In step S210, a payload cache may be managed using a linked list according to an access request to the compressed data. This is described with reference to FIGS. 6 to 10, and a detailed description thereof is thus omitted.

Figure 14:
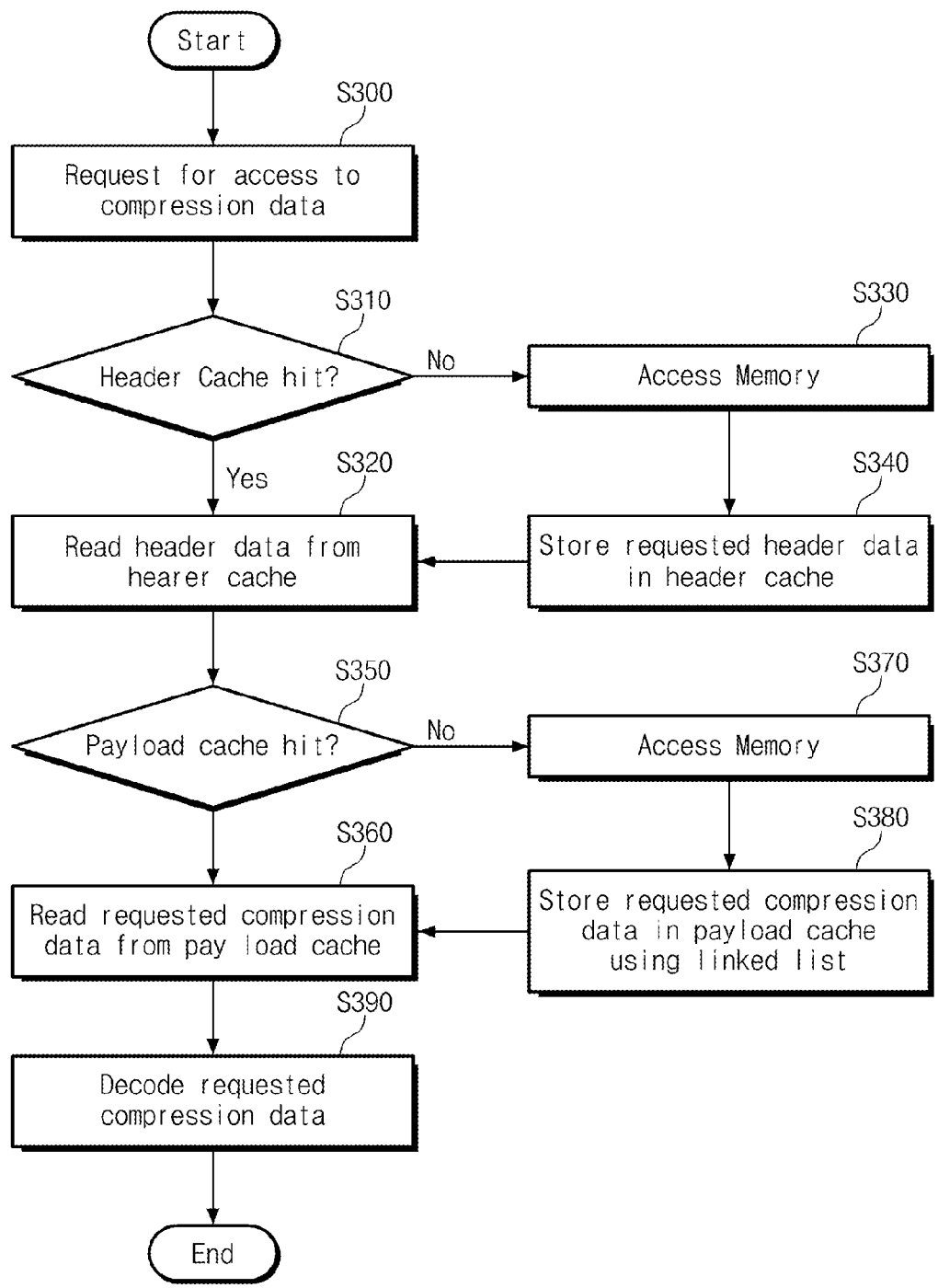
FIG. 14 a flowchart illustrating a cache managing method of a display driving apparatus according to an example embodiment of the inventive concepts.

FIG. 14 a flowchart illustrating a cache managing method of a display driving apparatus according to an example embodiment of the inventive concepts.

Steps S300 to S370 of FIG. 14 are substantially the same as steps S100 to S170 of FIG. 7, and a detailed description thereof is thus omitted.

Referring to FIGS. 5 and 14, in step S380, the decoding logic 330 may read requested compressed data corresponding to header information from the memory 200 and store the read compressed data at words of the payload cache line using a linked list. This is described with reference to FIGS. 8 to 12, and a detailed description thereof is thus omitted.

Afterwards, in step S390, the decoding logic 330 may restore the requested compressed data. The decoder 301 may output the restored data through the output buffer 320.

While the inventive concepts have been described with reference to example embodiments, it will be apparent to those skilled in the art that various changes and modifications may be made without departing from the spirit and scope of the inventive concepts. Therefore, it should be understood that the above example embodiments are not limiting, but illustrative.

What is claimed is:
1. A cache managing method of a display driving apparatus, the display driving apparatus including an encoder configured to generate compressed data by compressing raw data, a memory configured to store the compressed data, and a decoder including a payload cache and configured to restore the compressed data, the cache managing method comprising:

requesting an access to the compressed data; and managing the payload cache using a linked list according to the access request to the compressed data, wherein the linked list includes pointer information, the pointer information being information indicating a word of the payload cache to be connected next, and the pointer information stored at respective words of the payload cache at which the requested compressed data is stored.

2. The cache managing method of claim 1, wherein in response to the access request to the compressed data being cache missed, the managing includes storing the requested compressed data into the respective words of the payload cache using the linked list.

3. The cache managing method of claim 2, wherein the managing includes storing the requested compressed data and the pointer information.

4. The cache managing method of claim 2, wherein the managing includes storing at a payload tag a start address of the requested compressed data and the pointer information indicating a word where data corresponding to the start address is stored.

5. The cache managing method of claim 2, wherein the managing includes storing pieces of data, which correspond to continuous addresses, respectively, and are from among the compressed data, at words spaced from each other.

6. The cache managing method of claim 2, wherein the compressed data comprises a plurality of blocks, wherein the decoder is configured to read the compressed data from the memory by block, and wherein each of the blocks are divided into one or more transfer units, each of the transfer units has a size readable by a bus, and the size is equal to or smaller than each of the respective words of the payload cache.

7. The cache managing method of claim 6, wherein portions of respective two blocks are transferred through a single transfer unit of the transfer units.

8. The cache managing method of claim 7, wherein data in the single transfer unit for transferring the portions of the respective two blocks is stored at a first word, and information indicating a sequence of storing the portions of the respective two blocks in the first word is stored at the first word.

9. The cache managing method of claim 6, wherein the blocks include a first block and a second block, wherein a last portion of the second block is transferred through a portion of one of the transfer units, a first portion of the first block is transferred through the remaining portion of the one of the transfer unit, wherein first pointer information, which indicates that a word corresponding to a start address of the first block is a first word, is stored at a tag where the start address of the first block is stored, and wherein the second block is configured to store n words (n being a natural number of 2 or more) in order and second pointer information indicating that an n-th word is the first word is stored at an n-$1^{st}$ word of words where the second block is stored.

10. The cache managing method of claim 1, wherein the requesting an access to the compression data includes providing the decoder with a decoding request signal having information about a start address and a burst length of the requested compression data.

11. The cache managing method of claim 10, wherein the burst length is variable.

12. The cache managing method of claim 1, wherein a number of words of the payload cache is fixed.

13. The cache managing method of claim 12, wherein the payload cache is configured to cache data by word.

14. The cache managing method of claim 12, wherein data is stored at some words of the payload cache according to the access request to the compressed data and a flag indicating invalid data is set to the remaining words.

15. A cache managing method of a display driving apparatus which includes an encoder configured to compress data, a memory configured to store the compressed data, and a decoder including a payload cache line having a set number of words, the words each having a same size, and the payload cache line configured to restore the compressed data, the cache managing method comprising:

requesting an access to the compressed data; and caching, by the payload cache line, data with respect to each of the words according to the access request to the compressed data;

wherein the caching each of the words comprises storing pointer information at each respective word in the payload cache line, the pointer information indicating a word of the payload cache to be connected next relative to the respective word.

16. The cache managing method of claim 15, further comprising:

storing data at a portion of the words of the payload cache line according to the access request to the compressed data.

17. The cache managing method of claim 16, wherein the storing data comprises:

setting a flag indicating invalid data to remaining words of the payload cache line that have not been stored according to the access request to the compressed data in response to the portion of the words of the payload cache line being less than all of the words of the payload cache line.

18. A display driving apparatus comprising:

an encoder configured to compress data;

a memory configured to store the compressed data; and a decoder having a payload cache and configured to access the memory or the payload cache in response to a decoding request signal and restore the compressed data, and wherein the payload cache is configured to be managed using a linked list, the linked list including pointer information, and the pointer information being information indicating a word of the payload cache to be connected next, and the pointer information stored at respective words of the payload cache at which the compressed data is stored.

19. The display driving apparatus of claim 18, wherein the payload cache includes:

a tag configured to store a start address of the compressed data; and a payload cache line formed of a plurality of words and configured to store the compressed data.

20. The display driving apparatus of claim 19, wherein the decoder is configured to store the compressed data from the memory at the plurality of words of the payload cache line using the linked list in response to the decoding request signal being cache missed.

* * * * *